Figure 1:
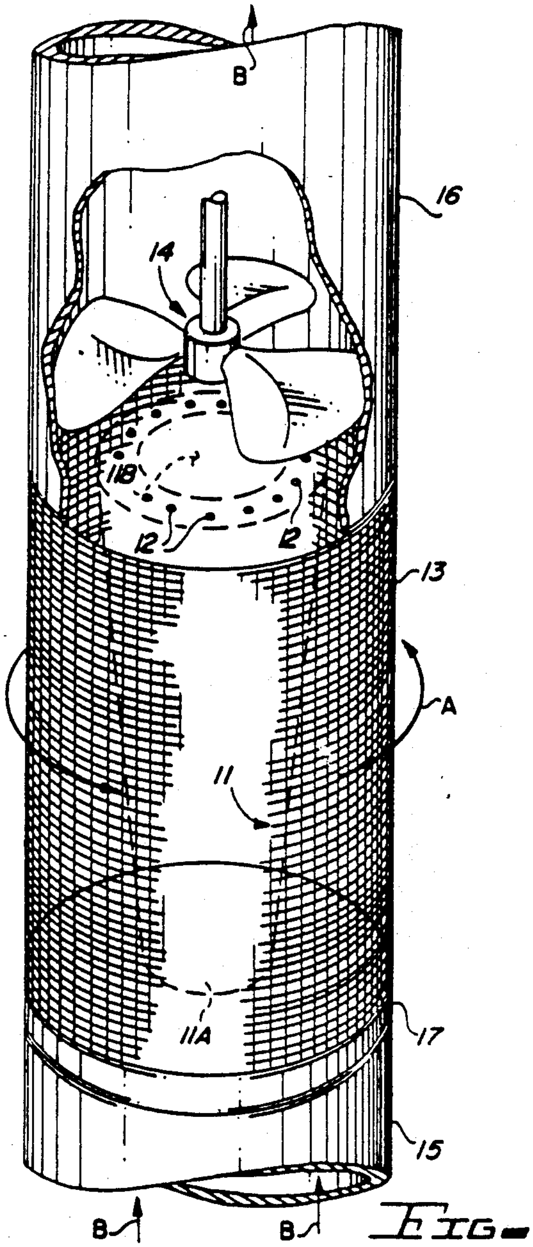

United States Patent [19]

Priestley, Jr.

[11] Patent Number: 4,923,488

[45] **Date of Patent: * May 8, 1990**

[54] APPARATUS FOR ALTERING THE DENSITY OF PARTICLES

[76] Inventor: Joseph B. Priestley, Jr., 13200 N. 103rd Ave., Sun City, Ariz. 85351

[ * ] Notice: The portion of the term of this patent subsequent to Dec. 29, 2004 has been disclaimed.

[21] Appl. No.: 332,165

[22] Filed: Apr. 3, 1989

Related U.S. Application Data

[63] Continuation-in-part of Ser. No. 180,198, Apr. 11, 1988.

[51] Int. Cl.[5] .................................................. B03C 1/00

[52] U.S. Cl. .......................................... 55/100; 55/267

[58] Field of Search .......................... 55/400, 100, 267; 422/140, 129

[56] References Cited

U.S. PATENT DOCUMENTS

| | | | |
|---|---|---|---|
| 4,685,943 | 8/1987 | Priestley | 55/400 |
| 4,716,022 | 12/1987 | Priestley | 156/345 |
| 4,830,638 | 5/1989 | Priestley | 156/345 |

*Primary Examiner*—Bernard Nozick
*Attorney, Agent, or Firm*—Tod R. Nissle

[57] ABSTRACT

Apparatus for treating particles while the particles are suspending in a circulating stream of air or other fluid. The apparatus causes particles to rotate around a vertical axis in confined circular paths of travel generally lying in a horizontal plane.

4 Claims, 2 Drawing Sheets

APPARATUS FOR ALTERING THE DENSITY OF PARTICLES

This is a continuation-in-part of my application Ser. No. 180,198, Filed Apr. 11, 1988 for "FILTRATION APPARATUS".

This invention relates to apparatus for treating and processing particles and for investigating the structure of tornados.

More particularly, the invention relates to apparatus for treating particles while the particles are suspended in a circulating stream of air or other fluid.

In further respect, the invention relates to apparatus for altering the shape and dimension, chemical composition, electron arrangement, weight, density, temperature and other physical properties of particles.

Tornados are rotating vortices that extend from the ground to the base of a thunderstorm and are generally of much greater intensity than hurricanes. See *Thunderstorms, Tornadoes and Building Damage* by Eagleman et al., Lexington Books (1975), ISBN 0-669-98137-0, Library of Congress Catalog Card Number 74-30674. Under ideal conditions a tornado vortex generally satisfies the basic vortex theorems of Lord Kelvin and Hermon von Helmholtz for a three dimensional vortex. These theorems are:

1. Vortex filaments either form closed curves or extend to the fluid boundary.
2. Circulation remains constant throughout the length of the vortex.
3. Circulation remains constant with time.
4. The particles of fluid comprising a vortex remain with that vortex.

In a simplified tornado vortex model the vortex has predominant vertical and cylindrical regions. A steady state condition in each region is assumed. The vertical regions are:

1. Generation region. The generation region is the upper region in which circulation and a sink are present to trigger the tornado vortex.
2. Intermediate region. The intermediate region of the vortex is that portion of the vortex between the generation region and the ground boundary layer region.
3. Boundary layer region. The boundary layer region is the region in which the tornado vortex interacts with the ground. The vortex must effectively end in this region such that the basic vortex theorems are satisfied.

The cylindrical regions perpendicular to the vortex center line are:

1. Core region. The core region is that portion of the vortex in which the fluid is assumed to rotate as a solid body. The radial velocity component is zero.
2. Interaction region. The interaction region is a thin region between the core flow region and the outer free vortex region in which viscous forces through spiral or Taylor vortices transfer energy from the core flow to the free vortex region. This region is thin and is neglected in pressure calculations in the same manner as the boundary layer region in the plane flows.
3. Free vortex region. The free vortex region is the region around the core. The flow in this region is predominantly tangential and, therefore, the radial and vertical components of velocity are assumed to be zero.

It is assumed that there is no viscous interaction between the free vortex and core flow regions.

Various investigations have been made concerning structure and functioning of tornados. Such investigations have in large part been theoretical and utilized laboratory simulations because of the difficulties associated with attempting to make measurements of conditions in actual tornados. See *Proceedings of the Symposium of Tornados, Assessment of Knowledge and Implications for Man,* June 22–24, 1986, Texas Tech University, Edited by Richard E. Petersen, Institute for Disaster Research, Texas Tech University, P.O. Box 4089, Lubbock, Texas, 79409 (1976).

A wide variety of apparatus for the treatment of particles of metal, plastics and other substances is well known in the art. Such treatments alter the shape and dimension, chemical composition, electron arrangement, weight, density, temperature and other physical properties of particles. It is advantageous to be able to treat or utilize particles when the particles are suspended and generally separated from one another while in a fluid. When particles are being carried in a stream of fluid, they are, although they may incidentally contact one another, often generally separated from one another, so that the fluid or another fluid added to the stream can readily contact the particles over the entire surface area of the particles. However, during conventional treatment process particles are typically carried in a stream of fluid which, unless the stream is unusually long or unless the particles are of the proper weight and size to be continuously suspended by a vertical stream of water, air or other fluid moving at a given velocity, are only carried in the stream of fluid for a relatively short period of time and are not confined to a limited treatment area during processing of the particles.

Accordingly, it would be highly desirable to provide improved apparatus for investigating the structure and functioning of naturally occurring tornados and for altering the shape and dimension, chemical composition, electron arrangement, weight, density, temperature and other physical properties of particles.

Therefore, it is a principal object of the invention to provide improved apparatus for studying the functioning of naturally occurring tornados and for altering the physical properties of particles.

Another object of the invention is to provide improved apparatus which facilitates the laboratory simulation and study of a tornado vortex utilizing conventional instrumentation.

A further object of the invention is to provide improved apparatus which permits particles to be treated while moving in a stream of fluid which maintains the particles within a relatively small area.

Still another object of the instant invention is to provide improved apparatus for altering the weight, density, temperature, chemical composition, shape and dimension, electron arrangement, or other physical properties of particles.

Figure 2:
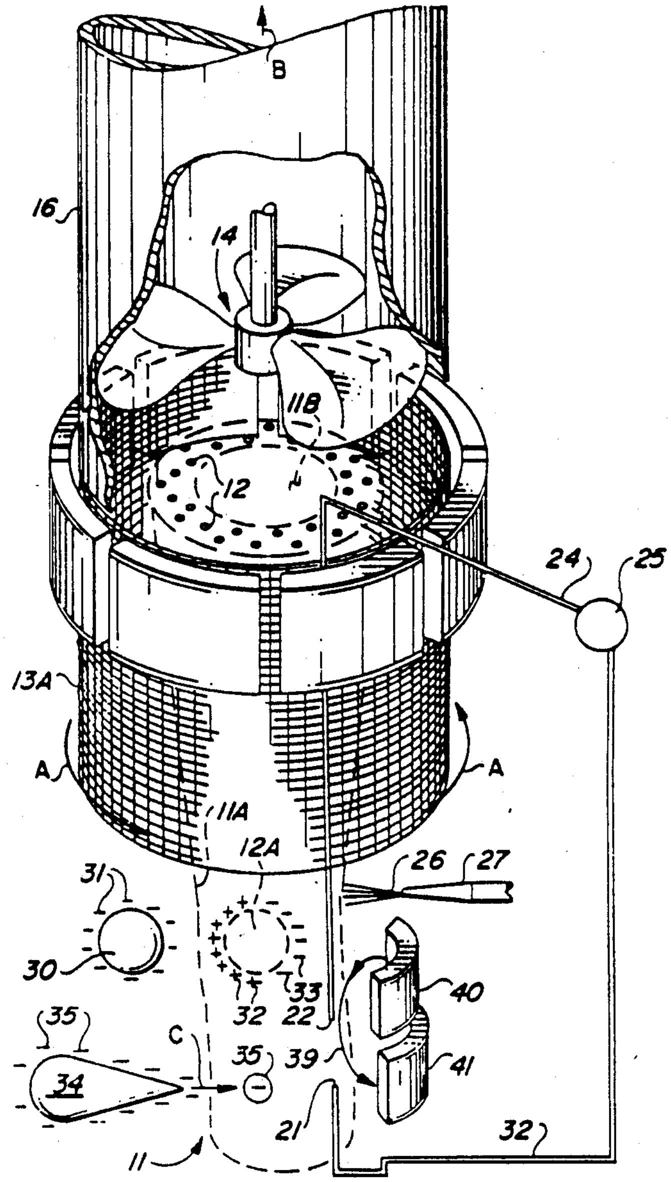

These and other, further and more specific objects and advantages of the invention will be apparent to those skilled in the art of the following detailed description thereof, taken in conjunction with the drawings, in which:

FIG. 1 is a perspective view illustrating apparatus constructed in accordance with the principles of the invention; and, FIG. 2 is a perspective view illustrating another embodiment of the invention.

Briefly, in accordance with my invention, I provide improved particle treatment apparatus. The apparatus includes means for mechanically forming a vortex in a volume of gas, the vortex comprising a central core and gas circulating around the central core, each of said particles when introduced into said circulating gas having a shape and dimension, a chemical composition, and arrangement of electrons therein, a weight, a density, and a temperature; and, particle treatment means generally adjacent said vortex for altering at least one of the physical properties of said particles in said vortex, said physical properties including the shape and dimension of the particles, the chemical composition of the particles, arrangement of electrons in the particles, the weight of the particles, the density of the particles and the temperature of the particles. The particles can be electrically conductive and the particle treatment means can comprise means for altering the electron arrangement in the particles. For instance, the particle treatment means can comprise means positioned adjacent the vortex to form a magnetic field passing through the vortex.

In another embodiment of my invention I provide improved air filtration apparatus. The filtration apparatus includes a filter; and, means for drawing air through the filter. The air drawing means includes apparatus for mechanically forming a vortex in a volume of air, the vortex comprising a central core and air circulating around the central core. The vortex has a lower portion and an upper portion, the lower portion of the vortex drawing air through the filter into the vortex.

Turning now to the drawings, which depict the presently preferred embodiment and best mode of the invention for the purpose of illustrating the practice thereof and not by way of limitation of the scope of the invention, and in which identical reference characters correspond to like elements throughout the several views, FIG. 1 illustrates a funnel or vortex 11 carrying particles 12. Vortex 11 is formed in conventional fashion by cylindrical screen 13 rotating in the direction of arrows A and by fan 14 which cause air of some other fluid to rise upwardly in the direction of arrows B through inlet conduit 15, filter 17, screen 13 and outlet conduit 16. Vortex 11 includes air or other fluid 11A circulating around core 11B. Particles 12 are carried in air B flowing from conduit 15 into filter 17. Filter 17 only permits particulate of a particular size to pass therethrough and into vortex 11. The lower portion of vortex 11 draws air or other fluids through filter 17 in the direction of arrows B.

In FIG. 2, vortex 11 is formed in conventional fashion by cylindrical screen 13A rotating in the direction of arrows A and by fan 14 which draws air upwardly through cylindrical screen 13A in the direction of arrows B. Particles 12 are introduces in vortex 11 as illustrated in FIG. 1 or can be introduced into vortex 11 of FIG. 2 in any other appropriate manner. Particles 12 carried in fluid 11A circulate around core 11B in the direction of travel generally indicated by arrows A. Tips 21, 22 of electrically conductive wires 23, 24 extend into core 11B near gas 11A circulating around the core. Tips 21, 22 receive electricity from charged particles 12 passing adjacent to or contacting tips 21, 22. Wires 24, 23 converge at common junction 25. Junction 25 can comprise a cell for receiving and storing electricity, a switch, or other apparatus for facilitating the collection of electricity from particles 12 carried in circulating gas 11A of vortex 11.

Matter is composed of neutral atoms. The electrical neutrality of the atoms is due to the fact that the positive charge of the nucleus of the atom is compensated for by the negative charge of the electrons that surround it. The outermost electron of an atom may either be only loosely connected to the rest of the atom or be more firmly imbedded in it. Atoms of the first type tend to part with electrons to adjacent atoms, while those of the second type tend to tear electrons away from adjacent atoms. It is because of this phenomenon that, for example, glass becomes positively charged when it is rubbed with a silk cloth whereas ebonite acquires a negative charge on being rubbed with a woolen cloth. Thus, rubbing a glass rod with silk and a ebonite rod with a woolen cloth, changes the arrangement of electrons at the surface of the glass and ebonite. The electron arrangement at the surface of the glass rod be further altered by grounding the surface of the glass rod. Electrons concentrated on the glass rod surface are discharged to the ground.

One method for altering the electron arrangement in an electrically conductive material is to pass the material through a magnetic field. When the material passes through a magnetic field, induction occurs, causing electrons to travel toward one end of the material in a direction transverse the magnetic field and the direction of travel of the material.

As used herein, the "electron arrangement" in a material comprises the general distribution and position of electrons therein, along with the electrical charge, positive or negative, at each point on the surface of the material. Altering the surface charge at a point on the surface of the material and/or altering the general position and distribution of electrons in the material constitutes altering the electron arrangement in the material.

In FIG. 2, when particles 12 are introduced into vortex 11, each particle has a particular shape and dimension, chemical composition, electron arrangement, weight, density, temperature, and various other physical properties. Particles 12 carried in circulating gas 11A can be treated to alter the shape and dimension, chemical composition, electron arrangement, weight, density, temperature and other physical properties of the particles. For example, fluid 26 can be sprayed into vortex 11 by a nozzle 27 in communication with a reservoir of fluid (not shown) and pressure source (not shown) for directing the fluid from the fluid reservoir through nozzle 27. Fluid 26 carried in circulating gas 11 coats and becomes a part of each particle 12 to alter the shape and dimension, weight, density and chemical composition thereof. If fluid 26 is an etchant, the shape and dimension, weight, and possibility the chemical composition of particles 12 will be altered after fluid 26 contacts and is removed from the particles. Since etchants usually interact with particles 12 to cause exothermic or endothermic chemical reactions, etchants alter the temperature of particles 12. Etchants can also alter the electron arrangement in particles 12 by effecting changes in the electrical surface charge of each of the particles.

Each particle 12 injected into vortex 11 has an overall surface charge which is positive, negative or neutral. As is well known, like charges repel. A pair of particles each having negatively charged surfaces repel each other. The electrically conductive particles 12 in vortex 11 can be treated to generate positive or negative electrical charges on the surface of the particles. For example, if an electrically conductive body 30 having a negative surface charge is positioned adjacent vortex 11 (FIG. 2), then the surface charges on particle 12A in circulating gas vortex 11 passing near body 30 tend so separate such that positive charges 32 accumulate on particle 12 near body 30 and negative charges 33 accumulate on the portion of particle 12A furthest from body 30. If particle 12A is near a ground, i.e., near tip 21 of wire 23 leading to junction 25 which is a ground, then negative charges 33 will flow from particle 12A to wire 23.

Another manner in which the surface charge of particle 12 in vortex 11 can be altered is by utilizing the "point effect". In the "point effect" electrons (or positrons) 35 concentrated at the tip of a conductor 34 are discharged or sprayed from conductor 34 in the direction of arrow C onto particles 12 in circulating gas 11A of vortex 11. When conductive particles 12 which have been sprayed with electrons 35 pass near a ground, i.e., near tip 21 of wire 23 when junction 25 is a ground, electricity flows from particles 12 to wire 21.

When electrically conductive particles pass through a magnetic field, an electric charge is generated in the particles be the travel of electrons within the particles in a direction transverse the magnetic lines and force and direction of travel of the particles through the magnetic field. Consequently, the travel of particles 12 in the direction of arrows A through the magnetic line of force 39 flowing from "north" magnet 40 to "south" magnet 41 generates a negative electric charge at one of particles 12. This electric charge can be transferred to point 21 of an electrically conductive wire 23 when particles 12 travel adjacent or contact point 21.

In FIG. 1, the temperature of particles 12 in vortex 11 can be increased by directing heated air through conduit 15 and filter 17 in the direction of arrows B.

As would be appreciated by those of skill in the art, various other means can be utilized to alter the physical properties of particles 12 carried in vortex 11. Tornado 11 can comprise or include plasma. Plasma can be directed into Tornado 11 to affect the physical properties of particles 12 carried therein. A beam of light directed into tornado 11 can, if particles 12 are photosensitive, be utilized to affect the physical properties of the particles. For instance, the light beam could, if the particles included a light sensitive photographical emulsion coating, change the color of the emulsion and particles. Color is a physical property of particles 12. A laser beam can be directed into tornado 11 to heat or otherwise affect the physical properties of particles 12.

The laser beam or other source of energy could be directed into the vortex 17 from a point near the vortex or from a point at any other desired distance from the vortex.

Cylindrical screen 13 can be replaced by a length of cylindrical tubing having a smooth continuous cylindrical surface, i.e., by a length of tubing which is not perforated.

In FIG. 1, the lower end of screen 13 need not be immediately adjacent filter 17. The lower end of screen 13 can instead be spaced upwardly apart from filer 17 and the lower end of the funnel can extend downwardly away from the lower end of screen 13 to filter 17, i.e., the funnel can bridge the difference between screen 13 and filter 17.

Fan 14 does not have to be mounted in outlet conduit 16. Conduit 16, can, if desired, be removed from the apparatus of FIGS. 1 and 2 during use of the invention.

The temperature of particles circulating in the vortex can be altered by using nozzle 27 to direct a heated or cooled liquid 26 into vortex 11. The fluid 26 has a temperature which is warmer or cooler than that of particles 12 in vortex 11. A laser beam can be directed into vortex 11 to heat particles 12. The source of the laser, or of fluid 26 for that matter, can be adjacent to or spaced a selected distance away from vortex 11. Nozzle 27 may be used to direct a fluid 26 into vortex 11 which endothermically or exothermically interacts with particles 12 to cool or heat them, respectively. A resistance heating element can be placed in or adjacent to vortex 11 to radiate heat into the vortex and warm particles 12. A condenser coil can be placed adjacent to or in vortex 11 to cool the vortex particles 12 therein. Plasma may also be utilized to heat particles, as may light. Ultraviolet light is especially useful in heating black or dark colored particles. Causing electricity to flow through electrically conductive particles can heat the particles. Plasma, light and electricity can be directed into vortex 11 from a point adjacent or spaced a selected distance away from vortex 11. Particles of ice injected into vortex 11 can cool particles of metal or other material 12 already in vortex 11. As would be appreciated by those of skill in the art, a variety of other means may be utilized to alter the temperature of particles 12 in vortex 11.

The density of particles circulating in the vortex can be altered by directing X-rays, infrared waves, visible light, ultraviolet, gamma rays, radio waves or other electromagnetic waves into the vortex 11 to impinge on the particles 12. Such waves can, by increasing the energy levels in the particles 12, cause electrons to escape from the particles 12 to alter the density of the particles. Apparatus for producing such electromagnetic waves is well known in the art. The chemical composition of the fluid circulating in the vortex 11 can be altered to cause gases or liquids in the particles to escape from the particles to reduce the density of the particles. For example, if the particles are salt or sugar, the humidity of air circulating in the vortex can be reduced to cause water to evaporate from the sugar or salt particles. Dehumidifiers are well known in the art and can be placed adjacent or spaced apart from the vortex to direct dehumidified air into the vortex. The chemical composition or temperature of the fluid circulating in the vortex can be altered to cause the particles to expand or contract to alter their density. If, for example, the particles 12 comprise kernels of popcorn or perlite, sufficient heat will, as is well known, cause the popcorn kernels or perlite to expand into a less dense particle. Apparatus for producing heated air and other fluids is well known in the art, as are means for directing heated fluid into vortex 11. The speed or velocity of fluid moving in the vortex 11 can be altered to affect the density of particles. For example, if the particles 12 comprise foam or other compressible materials, increasing the velocity of fluid circulating in the vortex 11 can increase the centrifugal forces acting on the particles 12 and increase the compressive forces acting on the particles. The fluid which circulates and forms the vortex 11 can be of a type which is absorbed by the particles 12 carried in the vortex. If the particles 12 are foam, dry paper, etc., and water mist is added to the vortex 11, the water is absorbed by the foam or paper particles to increase the density of the particles. Altering the density of the circulating fluid comprising the vortex 11 can also affect the density of particles 12 in the vortex 11.

For example, reducing the density of a gas comprising the vortex can lower the atmospheric pressure and enable water or other fluids to more readily escape from the particles 12. As would be appreciated by those of skill in the art, a variety of other means may be utilized to alter the temperature of particles 12 in vortex 11.

Having described my invention in such terms as to enable those skilled in the art to understand and practice it, and having identified the presently preferred embodiments and best mode thereof, I claim:

1. Particle treatment apparatus including
   (a) means for forming in a volume of fluid a funnel having an upper portion, a lower portion, a core region, and a vortex region of fluid circulating around said core region, said means including
      (i) a hollow cylindrical member having first and second inlet and outlet ends and a vertical axis,
      (ii) means for rotating said cylindrical member about said vertical axis to cause fluid to circulate around said axis, and
      (iii) means for drawing fluid through said rotating cylindrical member in a direction of travel from said second member to said first end;
   (b) means for introducing particles into said vortex region, said vortex region causing said particles to rotate around said vertical axis in confined circular paths of travel generally lying in said vortex region and in a horizontal plane;
   (c) particle treatment means for altering the density of particles carried in said vortex region.

2. The apparatus of claim 1 wherein said particle treatment means includes means for directing electromagnetic waves into said vortex region to impinge on said particles and cause electrons to escape therefrom.

3. The apparatus of claim 1 wherein said particles includes water and said particle treatment means includes means for reducing the water content of said fluid to cause water to escape from said particles into said vortex region.

4. The apparatus of claim 1 wherein
   (a) the temperature of said fluid in said vortex region is a first selected temperature;
   (b) said particles expand to a less dense configuration when the temperature of said fluid in said vortex region is raised from said first selected temperature to a second selected temperature; and,
   (c) said particles treatment means includes apparatus for raising the temperature of said fluid in said vortex region to said second selected temperature.

* * * * *